United States Patent
Ramesh et al.

(10) Patent No.: US 6,812,297 B2
(45) Date of Patent: Nov. 2, 2004

(54) COATING SYSTEMS CONTAINING MODIFIED CROSSLINKERS

(75) Inventors: Swaminathan Ramesh, Canton, MI (US); Paul Lessek, Milford, MI (US); Paul J. Harris, West Bloomfield, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 10/216,351

(22) Filed: Aug. 9, 2002

(65) Prior Publication Data

US 2003/0018129 A1 Jan. 23, 2003

Related U.S. Application Data

(62) Division of application No. 09/747,716, filed on Dec. 22, 2000, now abandoned.

(51) Int. Cl.$^7$ ............................................... C08L 83/04
(52) U.S. Cl. ...................... 525/474; 525/540; 528/254; 528/27; 528/28; 560/225; 106/287.11
(58) Field of Search ..................... 106/287.11; 525/474, 525/540; 528/254, 27, 28; 560/225

(56) References Cited

U.S. PATENT DOCUMENTS 4,241,116 A     12/1980  Taniyama et al. ............ 427/386
4,766,185 A  *  8/1988   Ryntz et al. ................. 525/479

FOREIGN PATENT DOCUMENTS

DE    24 36 191     3/1975    ............ C09D/3/00
GB    2047721       4/1979    ............ C08L/61/28

OTHER PUBLICATIONS

International Search Report PCT/US 01/42955.
Patent Abstract of Japan 55099930, Sumitomo Chem CO LTD.
Patent Abstract of Japan 11–012645 dated Aug. 2, 2000.

* cited by examiner

Primary Examiner—Kuo-Liang Peng

(57) ABSTRACT

The present invention provides a crosslinker for organic coatings having an amino resin core with substituents including more than one olefin functional group, a silicon-containing group, and at least one alkoxyalkyl or alkylol group. Coating compositions containing the crosslinker can be cured with radiation, especially ultraviolet radiation. The crosslinker can be included in a coating composition with one or more curable resins, applied onto a substrate and cured to form the cured coating of the invention.

6 Claims, No Drawings

COATING SYSTEMS CONTAINING MODIFIED CROSSLINKERS

This application is a divisional application of Ser. No. 09/747,716 filed on Dec. 22, 2000, which is now abandoned.

FIELD OF THE INVENTION

This invention relates to coating systems with modified crosslinkers. More specifically, it relates to radiation and thermal curing of coating systems containing modified crosslinkers, and to the use of modified amino resins as crosslinkers for coating systems to improve scratch and mar resistance.

BACKGROUND OF THE INVENTION

Curable, or thermosettable, coating compositions are widely used in the coatings art, particularly for topcoats in the automotive and industrial coatings industry. Basecoat-clearcoat composite coatings are topcoats that offer exceptional gloss, depth of color, distinctness of image, or special metallic effects. The automotive industry has made extensive use of basecoat-clearcoat composite coatings for automotive body panels. Single layer topcoats and the clearcoats of color plus clear composite coatings usually require an extremely high degree of clarity and gloss to achieve the desired visual effect. Furthermore, they must maintain the clarity and gloss over long periods of time in the face of environmental challenges.

Clearcoat coating compositions used as the outermost automotive coating are subject to damage caused by numerous elements. These elements include environmental fall out, exposure to ultraviolet radiation from sunlight, exposure to high relative humidity at high temperature, and defects made by impacts of small, hard objects resulting in chipping. Topcoats and outer coatings in general can be formulated to reduce so called scratch and mar, on the one hand, and environmental etch on the other. Scratch and mar refers to damage from impact, rubbing, or abrasion that produces visible scratches or marring that sometimes can be rubbed out. "Environmental etch" is a term applied to a kind of exposure degradation that is characterized by spots or marks on or in the finish of the coating that often cannot be rubbed out.

In order to be commercially successful, a coating should provide as many favorable characteristics as possible. Accordingly, it is most preferable to produce a coating having an optimum mix of characteristics with regard to various forms of damage resistance. For example, it would be desirable to provide an increase in scratch and mar protection without lessening the environmental etch protection.

A number of coating systems have been optimized over the years to provide a favorable combination of these properties. However, because the systems represent a compromise, usually one property has been at least partially sacrificed to increase the other. For example, a harder clearcoat film may be more resistant to environmental etch, but may be more prone to damage by scratching. On the other hand, a softer clearcoat film may be more scratch resistant, but more susceptible to environmental etch.

In Gummerson, Journal of Coatings Technology, vol. 62, pages 43–49 (1990), acrylated melamines in UV curable coatings are disclosed. The acrylated melamines have both acrylic and alkoxy functionality. The melamines may be UV cured by a free radical mechanism. However, the melamines have no silicon-containing groups. Furthermore, there is no discussion of improved scratch and mar resistance in cured films containing the acrylated melamines.

In Strazik, U.S. Pat. No. 4,280,938, unsaturated condensates of an alkoxy-methylmelamine, an allyl alcohol and an acrylamide are combined with an unsaturated oil modified resin in air drying compositions. The condensates contain olefin functionality and alkoxymethyl groups but do not have any silicon-containing groups. Furthermore, radiation curing is not contemplated for the compositions containing the condensates.

In Deiner, U.S. Pat. No. 4,113,947, addition products are manufactured from the reaction of nitrogen-containing compounds that contain at least one ethylenically unsaturated radical (such as, for example, allylmelamine) with organopolysiloxanes which contain hydrogen atoms bonded to silicon. These addition products contain in their structure a silicon-containing group, but they have no remaining ethylenic unsaturation because the silicon-hydrogen bond of the organopolysiloxanes reacts with the ethylenic unsaturation of the nitrogen containing compounds. As such, the addition products are not suitable for use in radiation cured coatings.

An object of the invention is to provide compositions that can be added in small amounts to coating systems to increase scratch and mar resistance, while maintaining other desirable coating properties. A further object is to provide methods for making cured coatings having improved properties of scratch and mar resistance. Another object is to provide a method for radiation curing for improving the scratch and mar resistance of coatings.

These and other objects are achieved by the radiation and thermal curing of the compositions of the invention.

SUMMARY OF THE INVENTION

The invention provides a crosslinker for organic coatings having an amino resin core with substituents including an olefin functional group, a silicon-containing group, and at least one alkoxyalkyl or alkylol group. Coating compositions containing the crosslinker can be cured thermally and with radiation, especially ultraviolet radiation. The crosslinker can be included in a coating composition with one or more curable resins, applied onto a substrate, and cured to form the cured coating of the invention.

In a preferred embodiment, the crosslinker can be prepared by reacting a) alkoxyalkylated amino resin with b) an unsaturated compound having a functional group reactive toward alkoxyalkyl groups and c) a silicon-containing compound having a functional group reactive toward alkoxyalkyl groups. In one embodiment, a coating composition containing the crosslinker undergoes a stratification in the coating system to which it is applied, so that the crosslinker is present at a relatively greater concentration at the surface of the coating.

DETAILED DESCRIPTION OF THE PREFERRED EMBODIMENTS

In one embodiment the invention provides a crosslinker with a combination of functional groups. The crosslinker has an amino resin core and, as substitutents on the amino resin core, at least one olefin functional group, a silicon-containing group, and at least one alkoxyalkyl or alkylol group. The functional groups on the amino resin core, as well as the relative proportions to one another, give the crosslinker desirable properties.

At its core, the crosslinker has an amino resin structure. Amino resins are the product of the reaction of various amines such as melamine, urea, guanidine, or benzoguanidine with an aldehyde such as formaldehyde, acetaldehyde, crotonaldehyde, benzaldehyde, and mixtures thereof. Examples of commonly used and well known amino resins include melamine formaldehyde resins, urea formaldehyde resins, and guanidine formaldehyde resins. Amino resins are described in *Encyclopedia of Polymer Science and Technology* vol. 1, p. 752–789 (1985), the disclosure of which is hereby incorporated by reference.

The reaction of the amine hydrogen and an aldehyde results in formation of an alkylol group on the nitrogen atoms of the amine. The structure of the alkylol group is derived from the alkyl chain of the aldehyde. For example, when the amine is reacted with formaldehyde, an amino resin is produced with methylol groups on the nitrogen atoms.

The alkylol groups are capable of self reaction to form oligomeric and polymeric materials. They are also reactive with a number of functional groups commonly found in conventional coating resins, such as hydroxyl groups, amino groups, and carbamate groups.

A preferred amino resin is one in which the alkylol groups have been reacted with an alcohol to form so-called etherified amino resins. Commercially available amino resins include methylated, butylated, and isobutylated resins, which are produced by reaction of the alkylol groups with methanol, butanol, and isobutanol respectively. Mixed etherified amino resins are prepared with combinations of two or more mono-functional alcohols. Mixtures of such resins are also useful.

The etherified amino resins are also known as alkoxyalkylated amino resins, to emphasize that the amino resins contain alkoxyalkyl groups on the nitrogens. Alkoxylated amino resins can be represented by the formula:

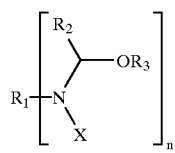

I

This represents in an idealized way the functional group resulting from the reaction of an amine $R_1(NH_2)_n$ with an aldehyde $R_2$—CHO and an alcohol $R_3$—OH, where $R_2$ is hydrogen or a $C_{1-20}$ alkyl or aryl group, $R_3$ is $C_{1-20}$ alkyl or aryl group, $R_1$ represents the amino resin core which can be monomeric, oligomeric, or polymeric, and n is the number of amine groups on the amino resin core. In the formula, X can be a hydrogen, an alkylol group, or an alkoxyalkyl group. A commonly used aldehyde is formaldehyde, in which case $R_2$ is a hydrogen atom, and the functional group on the nitrogen is an alkoxymethyl group.

The amino resins can self-condense to give oligomeric or polymeric substances having a higher molecular weight. Monomeric materials and the lower molecular weight oligomers are commonly used in the coatings industry as crosslinking agents. Useful materials are characterized by a degree of polymerization. For melamine formaldehyde resins, it is preferred to use resins having a number average molecular weight less than about 2000, more preferably less than 1500, and even more preferably less than 1000.

The alkoxyalkyl and alkylol groups on the nitrogens of the amino resins are reactive with a number of functional groups, which makes the amino resins useful as crosslinkers for coating systems containing resins having those functional groups. As is known in the art, such functional groups include hydroxyl, amine, carbamate, thiol, and others.

A preferred amino resin is melamine formaldehyde resin. Such resins are readily commercially available and have a desirably high functionality. The ideal monomeric melamine formaldehyde resin is hexafunctional, and all of the alkoxyalkyl, alkylol, or imino groups are available for reaction with functional groups such as those mentioned above. Commercially available melamine formaldehydes tend to have some two-ring and three-ring content, so that in practice the average functionality will be slightly higher than 6. The two ring compound, for example, is ideally decafunctional. The functionality of the resin will be a weighted average of the functionalities of the one ring, two-ring, three-ring, etc. compounds present in the mixture. The functionality is also related to the concept of equivalent weight. As used here, the equivalent weight is the molecular weight of the amino resin divided by its functionality as defined above.

The crosslinkers of the invention contain at least one, and preferably more than one olefin functional group as constituents on the amino resin core. The olefin functional groups can be introduced by reacting the amino resin, preferably an alkoxyalkylated amino resin, and most preferably an alkoxymethylated amino resin, with an unsaturated compound having a functional group reactive toward the amino resin or the alkoxyalkyl groups of the alkoxyalkylated amino resin. Examples of such reactive functional groups include hydroxyl and amino groups, with hydroxyl being preferred.

Examples of unsaturated compounds include, without limitation, amino-functional olefins, hydroxyl-functional olefins, hydroxyalkyl esters of unsaturated carboxylic acids, aminoalkyl esters of unsaturated carboxylic acids, and acrylamides.

Useful amino-functional olefins include, without limitation, $C_{3-20}$ organic compounds having a carbon-carbon double bond and an amino group. Specific examples include allylamine, 4-amino-1-butene, 6-amino-1-hexene, 8-amino-1-octene, 10-amino-1-decene, 12-amino-1-dodecene, oleylamine, and the like.

Useful hydroxy functional olefins include organic compounds having a carbon-carbon double bond, a hydroxyl group, and 3–20 carbon atoms. Specific examples of hydroxyl functional unsaturated compounds include, without limitation, allyl alcohol; 1-buten-4-ol, 1-hexen-6-ol, 1-octen-8-ol, 1-decen-10-ol, 1-dodecen-12-ol, oleyl alcohol, and the like.

Hydroxyalkyl esters of unsaturated carboxylic acids may be prepared from a variety of unsaturated carboxylic acids, including alpha-beta unsaturated acids such as acrylic acid, methacrylic acid, and crotonic acid as well as other unsaturated carboxylic acids such as 3-butenoic acid, 4-pentenoic acid, and 5-hexenoic acid. Preferred hydroxyalkyl esters are those with 2 to 10 carbon atoms in the alcohol portion.

Examples of hydroxyalkyl esters of unsaturated carboxylic acids include, without limitation, hydroxyethyl acrylate, hydroxyethyl methacrylate, hydroxypropyl acrylate, hydroxypropyl methacrylate, hydroxybutyl acrylate, hydroxybutyl methacrylate, and mixtures thereof.

Preferred aminoalkyl esters of unsaturated carboxylic acids include, without limitation, those with 2–10 carbon atoms in the aminoalkyl portion. The structures of the aminoalkyl esters are analogous to the structures of the hydroxyalkyl esters described above. In the aminoalkyl esters, the functional group reactive toward the amino resin will be an amino group. Preferred aminoalkyl esters of unsaturated carboxylic acids include aminoethyl acrylate, aminoethyl metharylate, aminopropyl acrylate, aminopropyl methacrylate, aminobutyl acrylate, aminobutyl methacrylate, and mixtures thereof.

Acrylamides are also useful as the unsaturated compound having a functional group reactive toward the amino resin. Acrylamide and methacrylamide are reactive toward the amino resin and are preferred acrylamide compounds. Other acrylamide derivatives include those analogous in structure to the hydroxyalkyl esters and the aminoalkyl esters of the unsaturated carboxylic acids, described above.

The unsaturated compound having a functional group reactive toward the amino resin reacts with alkoxyalkyl or alkylol groups on the amino resin to incorporate the olefin functionality of the unsaturated compound as a substituent on the amino resin core.

The silicon-containing compound contains at least one silicon atom and further contains a functional group reactive toward the alkoxyalkyl or alkyol groups of the amino resin. Such a reactive functional group is preferably a hydroxyl group or an amino group. A wide variety of structures is possible. For example, the silicon containing compound can contain a single silicon atom to which an alkyl chain is attached, the alkyl chain being substituted with a functional group reactive toward an alkoxyalkyl or alkylol group. Examples of such compounds include, without limitation, hydroxyalkyl trialkylsilanes such as hydroxymethyl trialkyl silanes or hydroxypropyl trialkyl silanes; and hydroxyalkyl silanes containing a mixture of alkyl and alkoxy groups on the silicon atom.

The silicon atom to which the alkyl chain is attached may alternatively be part of a disiloxane or polysiloxane chain. A non-limiting example would be hydroxyalkyl substituted polydimethylsiloxanes.

The alkyl group attached to the silicon atom may also contain polyether or polyester moieties terminated by a hydroxyl group or an amino group. Examples include ethoxylated, propoxylated, or butoxylated hydroxyalkyl-substituted polydimethylsiloxanes, such as are commercially available from BYK Incorporated. In a preferred embodiment, the silicon-containing compound comprises a polyester-modified polysiloxane of general structure

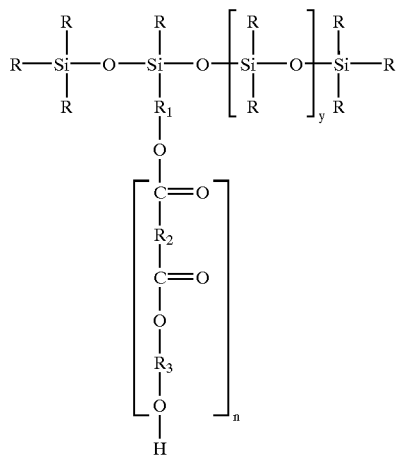

II where the R groups are independently $C_1$–$C_{20}$ alkyl or aryl groups, preferably methyl; $R_1$ is a $C_1$–$C_{20}$ bridging group, preferably methylene or higher alkylene groups: y is 0 or greater; $R_2$ and $R_3$ are selected from the group consisting of $C_2$–$C_6$ alkylene or benzene-diyl such as benzene-1,2-diyl, benzene-1,3-diyl, and benzene-1,4-diyl; n is 1 or greater, and n and y are chosen such that the hydroxyl number of the resulting polyester modified polydimethylsiloxane is from about 10 up to about 200. Preferably, the hydroxyl number will be from about 15 to about 180 mg KOH/g, and most preferably from 30 up to 160 mg KOH/g. Polyester-modified polysiloxanes are commercially available from BYK Chemie.

A crosslinker of the invention preferably has more than one olefin functional group so that it crosslinks during radiation curing. It is more preferred that the crosslinker have 2 or more olefin functional groups.

Crosslinkers with more than one olefin functional group can be prepared by reacting more than one equivalent of the unsaturated compound with the amino resin or alkoxyalkylated amino resin. For example, where the amino resin is a hexafunctional melamine formaldehyde resin, enough unsaturated compound should be reacted with the resin so as to add, on average, more than one olefin functional group per melamine ring. This is accomplished by using more than one equivalent of unsaturated compound for every 6 equivalents of the resin. Similarly, to produce crosslinkers preferably having two or more olefin functional groups, two or more equivalents of the unsaturated compound should be reacted with the amino resin. In the example of a melamine formaldehyde resin, two or more equivalents of unsaturated compound may be used for every six equivalents of resin.

A crosslinker of the invention preferably has at least one silicon-containing group incorporated onto the amino resin core. A crosslinker with at least one silicon-containing group on the core can be prepared by reacting at least one equivalent of the silicon containing compound with the amino resin or alkoxy amino resin. For example, where the amino resin is a hexafunctional melamine formaldehyde resin, enough silicon-containing compound should be reacted with the resin so as to add on average at least one silicon containing group per melamine ring. This is accomplished by using at least one equivalent of silicon-containing compound for every six equivalents of the resin. Similarly, to produce crosslinkers having more than one silicon-containing group per crosslinker molecule, more than one equivalent of the silicon-containing compound should be reacted with the amino resin. In the example of a melamine formaldehyde resin, more than one equivalent of silcon-containing compound may be used for every six equivalents of resin.

In another embodiment, it may be useful to incorporate, on average, less than one silicon-containing group per crosslinker molecule. In such a situation, a crosslinker is produced where not all of the crosslinker molecules have a silicon-containing group incorporated onto the resin core. Such crosslinkers may be incorporated into the coating compositions of the invention to provide increased scratch and mar resistance. However, it will be appreciated that the effectiveness of such crosslinkers for scratch and mar resistance may in general be proportionately lower than the crosslinkers containing amino resin cores that are substituted with at least one silicon-containing group per molecule, on the basis of there being a lower concentration of crosslinker molecules containing the active silicon-containing group.

The reaction of the Unsaturated compound or silicon-containing compound with the amino resin can be conveniently carried out by refluxing the reactants together in a non-reactive solvent such as xylene or toluene. The reaction normally proceeds at a satisfactory rate without catalysis. If desired, catalysts can be added, such as toluene sulfonic acid or hydrochloric acid.

It is desirable to remove the alcohol formed during the reaction by, for example, co-distilling or azeotroping it off along with the non-reactive solvent. It may be desirable during the course of the reaction to replace all or part of the non-reactive solvent distilled off. The progress of the reaction can be followed by determining, by gas chromatography or other known methods, the amount of alcohol or other by-product produced. Normally for reaction with an alkoxyalkylated amino resin, one equivalent of alcohol is liberated for every equivalent of unsaturated compound or silicon-containing compound incorporated.

Subject to the discussion above, the crosslinker of the invention has at least one alkoxyalkyl or alkylol group. In a preferred embodiment, alkoxalkyl groups are present in the amino resin starting material prior to reaction with the unsaturated compound or silicon containing compound. In that case, some of the alkoxyalkyl groups of the amino resin react with the unsaturated compound or the silicon containing compound, as described above. It is important that not every alkoxymethyl group on the amino resin core be reacted with the two above components, so that at least one alkoxyalkyl group is left on the amino resin core.

In another embodiment, alkylol groups or a mixture of alkylol and alkoxyalkyl groups are present in the amino resin starting materials prior to reaction with the unsaturated compound or the silicon-containing compound. As above, at least one alkoxyalkyl or alkylol group should be left on the core after reaction with the components. Any remaining alkylol groups on the crosslinker may be etherified, if desired, to form corresponding alkoxyalkyl groups.

The novel crosslinkers described above may be used in a coating composition, optionally along with another conventional crosslinker that does not have both the olefin functionality and the silicon containing functionality. The conventional crosslinker may or may not be an amino resin, but it will contain functional groups reactive with the resins of the coating composition.

The crosslinker of the invention may be used in a minor amount relative to the conventional crosslinker or to the crosslinking equivalents in a self-curing resin system. For example, it is preferred to use the novel crosslinker in such an amount that from about 0.1 to about 20%, on an equivalent basis, of the resin-reactive functional groups of the total crosslinking composition are contributed by the crosslinker of the invention. More preferably, from about 0.1 to about 10%, and most preferably from about 0.1 to about 3% on an equivalent basis of the functional groups in the crosslinking composition will be contributed by the crosslinker of the invention.

As will be appreciated by one skilled in the art, the choice of conventional crosslinking agent depends on various factors such as compatibility with the film-forming resin, the particular type of functional groups on the film-forming resin and the like. The crosslinking agent is used to crosslink the film-forming resin by either condensation reactions or non-free radical addition reactions or a combination of both of these. When for example the thermosetting reactants can be crosslinked in the presence of moisture or when the reactants include monomers having complementary groups capable of entering into crosslinking reactions, the conventional crosslinking agent may be omitted if desired.

Representative examples of conventional crosslinking agents include aminoplasts, phenol/formaldehyde adducts, and crosslinkers having blocked and/or unblocked isocyanate groups, epoxide groups, carbamate groups, siloxane groups, cyclic carbonate groups, or anhydride groups. Examples of such compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Aminoplast resins such as melamine formaldehyde resin or urea formaldehyde resin are especially preferred. When aminoplast resins are employed as the conventional crosslinking agent, particularly suitable are the melamine-formaldehyde condensates in which a substantial proportion of the methylol groups have been etherified by reaction with a monohydric alcohol.

The coating compositions of the present invention contain the crosslinking composition of the invention and a binder system containing at least one crosslinkable resin. Such crosslinkable resin or resins may contain more than one kind of functional group, and may contain functional groups reactive with each other. In the latter case the resin may undergo crosslinking or curing with itself, perhaps even in the absence of a separate crosslinking agent. When the resin or resins contain only one kind of functional group, or when they have more than one kind but the groups are not reactive with one another, a conventional crosslinker may be added to facilitate the curing process. At least one of the crosslinkable resins used has a functional group which is reactive with the alkoxyalkyl or alkylol group or groups of the crosslinker of the invention. With that limitation, a number of crosslinkable resins and conventional crosslinkers may be used in the coating compositions of the invention.

As used herein, the term "crosslinkable resin" is intended to include not only those resins capable of being crosslinked upon application of heat but also those resins capable of being crosslinked without the application of heat. Examples of such crosslinkable resins include thermosetting acrylics, aminoplasts, polyurethanes, carbamate functional resins, carbonate functional resins, polyesters, epoxies, silicones and polyamides. These resins, when desired, may also contain functional groups characteristic of more than one class, as for example, polyester amides, urethane acrylates, carbamate functional acrylates, etc.

Acrylic resins refer to the generally known addition polymers and copolymers of acrylic and methacrylic acids and their ester derivatives, acrylamide and methacrylamide, and acrylonitrile and methacrylonitrile. Examples of ester derivatives of acrylic and methacrylic acids include alkyl acrylates and alkyl methacrylates such as ethyl, methyl, propyl, butyl, hexyl, ethylhexyl and lauryl acrylates and methacrylates, as well as similar esters, having up to about 20 carbon atoms in the alkyl group. Also, hydroxyalkyl esters can readily be employed. Examples of such hydroxyalkyl esters include 2-hydroxyethyl acrylate, 2-hydroxypropyl acrylate, 2-hydroxyethyl methacrylate, 2-hydroxypropyl methacrylate, 3-hydroxypropyl methacrylate, 4-hydroxybutyl methacrylate, and mixtures of such esters having up to about 5 carbon atoms in the alkyl group. Where desired, various other ethylenically unsaturated monomers can be utilized in the preparation of acrylic resins, examples of which include: vinyl aromatic hydrocarbons optionally bearing halo substituents such as styrene, alpha-methyl styrene, vinyl toluene, alpha-chlorostyrene; non-aromatic mono-olefinic and di-olefinic hydrocarbons optionally bearing halo substituents, such as isobutylene, 2,3-dimethyl-1-hexene, 1,3-butadiene, chlorethylene, chlorobutadine and the like; and esters of organic and inorganic acids such as vinyl acetate, vinyl propionate, isopropenyl acetate, vinyl chloride, allyl chloride, vinyl alpha chloracetate, maleic acid and its monoesters, dimethyl maleate and the like.

The coating composition of the invention may contain as a crosslinkable resin an aminoplast resin different from the amino resin based crosslinker of the invention. As a crosslinkable resin, aminoplast resins refer to the generally known condensation products of an aldehyde with an amino- or amido-group containing substance examples of which include the reaction products of formaldehyde, acetaldehyde, crotonaldehyde, benzaldehyde and mixtures thereof with urea, melamine or benzoguanidine. Preferred aminoplast resins include the etherified (i.e. alkylated) products obtained from the reaction of alcohols and formaldehyde with urea, melamine, or benzoguanidine. Examples of suitable alcohols for preparation of these etherified products include: methanol, ethanol, propanol, butanol, isobutanol, t-butanol, hexanol, benzylalcohol, cyclohexanol, 3-chloropropanol, and ethoxyethanol.

Polyurethane or polyurea resins refer to the generally known thermosetting resins prepared from organic polyisocyanates and organic compounds containing active hydrogen atoms as found for example in hydroxyl, and amino moieties, respectively. Some examples of polyurethane resins typically utilized in coating compositions include the isocyanate-modified alkyd resins. Examples of systems based on polyurethane resins typically utilized as two-pack coating compositions include an organic polyisocyanate or isocyanate-terminated prepolymer in combination with a substance containing active hydrogen as in hydroxyl or amino groups together with a catalyst (e.g. organotin salt such as dibutyltin dilaurate). The active hydrogen-containing substance in the second pack typically is a polyester polyol, a polyether polyol, or an acrylic polyol known for use in such two-pack urethane resin systems. Another example of a polyurethane resin is a one pack system with blocked polyisocyanate and/or isocyanurates that unblock at high temperatures. Hydroxyl terminated polyurethanes are also used as a crosslinkable resin.

Polyester resins are generally known and are prepared by conventional techniques utilizing polyhydric alcohols and polycarboxylic acids. Examples of suitable polyhydric alcohols include, without limitation, ethylene glycol, propylene glycol, diethylene glycol, dipropylene glycol, butylene glycol, neopentyl glycol, glycerol, trimethylolpropane, pentaerythritol, sorbitol, 1,6-hexanediol, 1,4-cyclohexanediol, 1,4-cyclohexanedimethanol, and 1,2-bis(hydroxyethyl)cyclohexane. Examples of suitable polycarboxylic acids include, without limitation, phthalic acid, isophthalic acid, terephthalic acid, trimellitic acid, tetrahydrophthalic acid, hexahydrophthalic acid, tetrachlorophthalic acid, adipic acid, azelaic acid, sebacic acid, succinic acid, malic acid, glutaric acid, malonic acid, pimelic acid, succinic acid, 2,2-dimethylsuccinic acid, 3,3-dimethylglutaric acid, 2,2-dimethylglutaric acid, maleic acid, fumaric acid, and itaconic acid. Anhydrides of the above acids, where they exist, can also be employed and are encompassed by the term "polycarboxylic acid." In addition lactones such as caprolactone, propylolactone, and methyl caprolactone and hydroxy acids such as hydroxycaproic acid and dimethylolpropionic acid are useful. If a triol or higher hydric alcohol is used, a monocarboxylic acid such as acetic acid and benzoic acid may be used in the preparation of the polyester resin. Moreover, polyesters are intended to include polyesters modified with fatty acids or glyceride oils of fatty acids (i.e. conventional alkyd resins). Alkyd resins typically are produced by reacting the polyhydric alcohols, polycarboxylic acids, and fatty acids derived from drying, semi-drying, and non-drying oils in various proportions in the presence of a catalyst such as sulfuric acid, or a sulfonic acid to effect esterification. Examples of suitable fatty acids include saturated and unsaturated acids such as stearic acid, oleic acid, ricinoleic acid, palmitic acid, linoleic acid, linolenic acid, licanic acid and elaeostearic acid.

Epoxy resins are generally known and are based on compounds or mixtures of compounds containing more than one 1,2-epoxy group (i.e. polyepoxides). The polyepoxides may be saturated or unsaturated, aliphatic, cycloaliphatic, aromatic or heterocyclic. Non-limiting examples of suitable polyepoxides include the generally known polyglycidyl ethers of polyphenol and/or polyepoxides which are acrylic resins containing pendant and/or terminal 1,2-epoxy groups. Polyglycidyl ethers of polyphenols may be prepared, for example, by etherification of a polyphenol with epichlorohydrin or dichlorohydrin in the presence of an alkali. Examples of suitable polyphenols include without limitation 1,1-bis(4-hydroxyphenyl)ethane; 2,2-bis(4-hydroxyphenyl)propane; 1,1-bis(4-hydroxyphenyl)isobutane; 2,2-bis(4-hydroxylphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxynapthyl)methane; and the hydrogenated derivatives thereof. The polyglycidyl ethers of polyphenols of various molecular weights may be produced, for example, by varying the mole ratio of epichlorohydrin to polyphenol. Epoxy resins also include the polyglycidyl ethers of mononuclear polyhydric phenols such as the polyglycidyl ethers of resorcinol, pyrogallol, hydroquinone, and pyrocatechol. Epoxy resins also include the polyglycidyl ethers of polyhydric alcohols such as the reaction products of epichlorhydrin or dichlorohydrin with aliphatic and cycloaliphatic compounds containing from two to four hydroxyl groups including, for example, ethylene glycol, diethylene glycol, triethylene glycol, dipropylene glycol, tripropylene glycol, propanediols, butanediols, pentanediols, glycerol, 1,2,6-hexanetriol, pentaerythritol and 2,2bis(4-hydroxycyclohexyl)propane. Epoxy resins additionally include polyglycidyl esters of polycarboxylic acids such as the generally known polyglycidyl esters of adipic acid, phthalic acid, and the like.

Addition polymerized resins containing epoxy groups may also be employed. These polyepoxides may be produced by the addition polymerization of epoxy functional monomers such as, without limitation, glycidyl acrylate, glycidyl methacrylate and allyl glycidyl ether optionally in combination with ethylenically unsaturated monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate and isobornyl methacrylate.

Carbamate-functional resins are known in the art to be useful in clearcoat compositions. One preferred carbamate-fuctional resin has a plurality of carbamate groups pendant to an acrylic backbone. The carbamate groups may be introduced into the resin by transcarbamation of a hydroxyl functional resin following polymerization of acrylic monomers, or may be prepared from acrylic monomers containing carbamate functional groups. Such carbamate functional acrylic resins are described, for example, in Rehfuss et al., U.S. Pat. No. 5,605,965, the disclosure of which is hereby expressly incorporated by reference.

Cured coatings are produced by applying onto a substrate a coating composition of the invention. The coating composition includes one or more of the crosslinkable resins having reactive functional groups and one or more crosslinking agents which have functional groups which are reactive with those of the resins, including at least one of the crosslinkers of the invention. After application onto the substrate, the coating composition is cured thermally and also by the application of radiation, for example by electron beam radiation or ultraviolet radiation. The thermal curing and the radiation curing steps may be carried out simultaneously. Alternatively, the thermal curing step may occur prior to the radiation curing step, or the radiation step may be carried out before the thermal curing step.

Thermal curing refers to the application of heat after the mixture has been applied to substrate in order to accelerate the reactions between the functional groups of the resin and the crosslinking agent or agents. For some crosslinkable systems, the curing temperature is well above the coating temperature, so that essentially no thermal crosslinking takes place until heat is applied. Other thermally curing systems are designed to cure, at least at a slow rate, even at room temperature. In these situations it can be said that the thermal curing begins immediately after application of the coating composition onto the substrate. In general, it is preferred that the thermal curing step be carried out at least in part before the radiation treatment is begun.

Radiation curing is carried out by exposing the curing composition to radiation, preferably in the form of electron beam radiation or ultraviolet radiation. For ease of use and for cost considerations, ultraviolet radiation is preferred. When ultraviolet radiation is used to cure the coating compositions, it is common to include in the coating compositions an activator which will promote the formation of radicals from the double bonds present in the crosslinking composition. Depending on the activators, the wavelength of ultraviolet radiation required can range from 200 nanometers up to about 380 nanometers.

Without being bound by theory, it is believed that the crosslinker and the coating compositions of the invention function in the following way. The silicon-containing crosslinker of the invention tends to migrate to the surface of the coating composition. Thus the silicon containing crosslinkers of the invention tend to be concentrated at the liquid to air interface of the coating composition which is at the surface so that the concentration of the crosslinker of the invention is greater in the liquid to air interface than in the bulk portion of the coating composition. The olefin functionality on the novel crosslinker is available to participate in the radiation curing reaction by participating in 1,2 addition to itself under radical initiation. Thus, there is formed by radiation curing a crosslinked network of silicon-containing crosslinking agents with an enhanced concentration at the surface of the coating. It is believed that this results in the increased scratch and mar resistance of the resulting coatings. At the same time, the alkoxyalkyl or alkylol groups of the crosslinker of the invention react with the resins and anchor the crosslinking agent in the coating. It is believed that this minimizes the problems of migration that otherwise tend to be observed with silicone additives and coatings.

The novel crosslinkers, coating compositions and methods for preparing a cured coating have been described above with respect to preferred embodiments. The following examples give further non-limiting descriptions of the use of the novel crosslinkers in the coatings of the invention.

EXAMPLES

Resimine 737 is a methylated melamine formaldehyde resin, with an equivalent weight of about 130 per reactive functional group. Resimine 747 is a hexamethoxymethyl melamine having an equivalent weight of about 75 per methoxymethyl group. It is available commercially from Solutia.

BYK-LPG6962 is a hydroxy terminated polyester modified polydimethyl siloxane. It has a hydroxyl number of about 80 and an equivalent weight per hydroxyl of about 700. It is a commercial product of Byk Chemie.

MEK rubs is determined according to ASTM D-5402.

The mar rating is determined according to ASTM D-5178.

The Tukon hardness is determined according to ASTM D-1474.

The IR results are obtained by attenuated reflectance spectroscopy (ATR).

Preparation A

A round bottom flask was charged with 200 grams of Resimine 747 and 350 grams of BYK-LPG 6962. The contents were heated with 250 grams of toluene solvent to 130° C. and the methanol by-product was azeotroped off. The extent of reaction was determined by measuring stoichiometric amounts of methanol given off by gas chromatography. When gas chromatography results indicated 90% theoretical completion of the reaction, 116 grams of hydroxyethyl acrylate was added along with 100 grams of toluene and the azeotropic removal of methanol continued at 130° C. until the reaction was judged to be over 90% complete based on gas chromatography results. The contents were cooled and the solids adjusted to 60% by weight with toluene. The reaction product contains triazine ring and has about one silicon containing group, two acrylic groups, and three methoxymethyl groups available for crosslinking with a principal resin.

Preparation B

A round bottom flask was charged with 200 grams of Resimine 747 and 180 grams of BYK-LPG6962. The contents were heated with 250 grams of toluene to 130° and the methanol by-product was azeotroped off. The extent of the reaction was followed by gas chromatography as in Preparation A. When the reaction was 90% complete, 116 grams of hydroxyethyl acrylate was added along with 50 grams of toluene and the azeotropic removal of methanol continued at 130° C. until the reaction was 90% complete based on gas chromatography. The contents were cooled and the solids adjusted to 60% by weight with toluene. The reaction product contains a triazine ring with about two acrylic groups and three methoxymethyl groups available for crosslinking with a principal resin. About half of the triazine rings contain a silicon group.

Preparation C

In a reaction vessel, 420 g of hexamethoxymethylmelamine (HMMM, high monomeric content, eq. wt 70 g/methoxymethyl group) with 292 g of hydroxypropyl acrylate (HPA) and 200 g of xylene was heated to reflux under a stream of air. Methanol by-product of the reaction was removed as an azeotrope with xylene. When the expected amount of methanol was collected (about 64 g), 700 g of BYK-LPG6962 (silicon-containing compound) was added and the azeotropic removal of methanol continued. When 32 g more of methanol was collected, enough xylene was added to make the final concentration of product about 50% by weight. The IR spectrum of the crosslinker showed the presence of melamine triazine ring, siloxane group, and double bonds. The GC also confirmed that the amount of unreacted HPA was less than 1%.

Preparation D—Basic Paint

A coating composition was prepared by combining an acrylic resin (equivalent weight of 425 grams per carbamate group) and Resimine 737 (equivalent weight 130 grams per reactive functional group) in equivalent amounts. Two drops of dodecylbenzenesulfonic acid catalyst were added. Viscosity was adjusted with amyl acetate to a spray viscosity of 30–40 seconds in a Ford #4 cup.

Examples 1–4

In Examples 1–4, fifty grams of preparation D was mixed with three grams of the UV curable amino resin produced in Preparation B. In Examples 1–3, the test formula also contained 0.3 grams of Genocure® MBF photoinitiator.

Thermal curing was carried out at 260° F. for 30 minutes. Ultraviolet (UV) cure was performed with a hydrogen bulb at 95% intensity at 0.712 J/cm². The conveyor speed was 16 feet per minute. Each panel was subjected to two passes.

In Examples 1–4, the paints were spray coated onto a phosphated electrocoat primed steel panel. The mar test, double-rub test, Tukon hardness test, and attenuated reflectance IR test were performed on the coated panels.

Comparative Example C1, prepared using Preparation C, did not contain the crosslinkers of the invention. The MEK rubs test is acceptable with greater than 150 until failure. The mar rating of 2.5 and the Tukon hardness of 6.2 established a baseline against which the coating compositions of the invention were compared.

Examples 1 and 2 illustrate the effect of UV cure on coating compositions of the invention. In Example 1, the coating composition is thermally cured, but not UV cured. The mar rating is 3 and the Tukon hardness is 6.2. In Example 2, the coating composition of the invention is both thermally cured and UV cured. The mar rating improves significantly to 2, and the Tukon hardness remains acceptable at 5.4.

Example 3 illustrates the importance of thermally curing the coating compositions of the invention. The MEK rubs were less than 20 and the mar rating increased to 5. Example 4 illustrates the effect of curing coating compositions containing the crosslinkers of the invention but not containing ultraviolet photoinitiators. Without the photoinitiator, the UV cure did not improve the mar rating from the 2.5 of the comparative example.

Infrared attenuated reluctance spectroscopy was used to determine the presence of double bonds in the cured coatings of Examples 1–4. As noted in the footnotes of the Table, when the coating compositions of the invention were thermally cured but not UV cured (Example 1), there was infrared evidence of double bonds at the surface of the composition. When the coating compositions underwent UV cure, the attenuated reflectance spectroscopy indicated a lower amount of double bonds at the surface than for the non-UV cured compositions. Example 3 illustrates that even when the coating composition of the invention was not thermally cured, UV cure of the composition nevertheless resulted in a reduced concentration of double bonds at the surface of the UV cure coating. Finally, Example 4 illustrates that when thermal cure and ultraviolet cure are both carried out, but the ultraviolet cure is carried out in the absence of a photoinitiator, the results resemble those of Example 1 where the ultraviolet cure was not carried out.

Examples

|  | C1 | 1 | 2 | 3 | 4* |
|---|---|---|---|---|---|
| Preparation C | 50 | 50 | 50 | 50 | 50 |
| Preparation B | – | 3 | 3 | 3 | 3 |
| Thermal cure | + | + | + | – | + |
| uv cure | – | – | + | + | + |
| MEK rubs | >150 | >150 | >150 | <20 | >150 |
| Mar rating | 2.5 | 3 | 2 | 5 | 2.5–3 |
| Tukon hardness | 6.2 | 6.2 | 5.4 | – | 6.7 |
| IR | – | (1) | (2) | (3) | (4) |

(1) evidence of double bonds on the surface
(2) fewer double bonds on the surface than in Example 1
(3) like Example 2
(4) like Example 1
*contains no photoinitiator Example 5

243 g of acrylic clearcoat resin (containing hydroxyl groups) was mixed with 6 grams of the silicon-containing experimental melamine crosslinker of Preparation C. The mixture was spray coated with a mixture of isophorone isocyanurates and hexamethylene isocyanurates (64 g)—2 feed system on to a black waterborne basecoat on a primered steel panel to make a test panel. A control panel was produced by spraying the clearcoat resin without the experimental crosslinker. The coated panels were cured at 250° F. for 30 minutes. One half of each panel was covered with aluminum foil and the panels were subjected to UV cure with a hydrogen bulb at 95% intensity at 0.712 J/cm², with two passes. The conveyor speed was 16 feet per minute. Thus both halves of the panels were thermally cured, but only one half was UV cured.

The cured panels were tested by ATR. Both the covered (non-UV cured) and the uncovered (UV-cured) halves of the test panel coated with a composition containing the experimental crosslinker showed the presence of melamine and siloxane peaks at the surface. The covered half had more double bond character than the uncovered half.

The panels were subjected to the ASTM scratch and mar test, along with measurements of gloss before and after the test. The covered half of the test panel (the half not UV cured) retained only 79% of the initial gloss after the scratch and mar test. On the other hand, the UV cured half retained 86% of gloss. With the control panel, the exposed and covered portions did not show any difference in gloss retention.

The invention has been described in detail with reference to preferred embodiments thereof.

We claim:

1. A composition comprising a crosslinker for organic coatings comprising the reaction product of
   a) an amino resin comprising reactive groups selected from the group consisting of alkoxyalkyl, alkylol, and mixtures thereof;
   b) an olefinically unsaturated compound having a functional group reactive toward the reactive groups on the amino resin, wherein the olefinically unsaturated compound is selected from the group consisting of aminofunctional olefins, hydroxyl functional olefins, aminoalkyl esters of unsaturated carboxylic acids and acrylamides; and
   c) a silicon-containing compound having a functional group reactive toward the reactive groups on the amino resin.

2. The composition according to claim 1, wherein the amino resin comprises a melamine formaldehyde resin.

3. The composition according to claim 2, wherein the melamine formaldehyde resin has a number average molecular weight of up to about 2000.

4. The composition according to claim 1, wherein the silicon-containing compound comprises a silicon atom to which an alkyl chain is attached, said alkyl chain being substituted with a functional group reactive toward the reactive groups on the amino resin.

5. The composition according to claim 1, wherein the silicon-containing compound comprises a compound of structure:

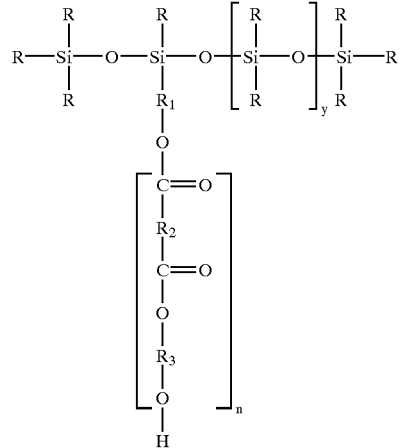

where the R groups are each independently $C_1$–$C_{20}$ alkyl or aryl groups; $R_1$ is a $C_1$–$C_{20}$ bridging group; y is 0 or greater; $R_2$ and $R_3$ are each independently selected from the group consisting of $C_2$–$C_6$ alkylene, benzene-1,2-diyl, benzene-1,3,-diyl, and benzene-1,4-diyl; n is 1 or greater, and the hydroxyl number is from about 10 mg KOH/g up to about 200 mg KOH/g.

6. The composition according to claim 1, wherein the crosslinker comprising 2 or more olefin functional groups.

* * * * *